United States Patent [19]

Merard

[11] 4,092,518
[45] May 30, 1978

[54] METHOD OF DECORATING A TRANSPARENT PLASTICS MATERIAL ARTICLE BY MEANS OF A LASER BEAM

[75] Inventor: René Rémy Merard, Igny, France

[73] Assignee: Laser Technique S.A., Buren, Switzerland

[21] Appl. No.: 749,271

[22] Filed: Dec. 7, 1976

[51] Int. Cl.$^2$ ............................................. B23K 27/00
[52] U.S. Cl. .............................. 219/121 LM; 264/25; 264/132; 83/7
[58] Field of Search .... 219/121 LM, 121 L, 121 EM; 83/7; 264/25, 24, 132

[56] References Cited

U.S. PATENT DOCUMENTS

| | | | |
|---|---|---|---|
| 3,404,254 | 10/1968 | Jones | 219/121 LM |
| 3,589,883 | 6/1971 | Dear | 83/7 X |
| 3,610,871 | 10/1971 | Lumley | 219/121 LM |
| 3,627,858 | 12/1971 | Parts et al. | 219/121 LM |
| 3,663,793 | 5/1972 | Petro et al. | 219/121 LM |
| 3,695,497 | 10/1972 | Dear | 219/121 LM X |
| 3,740,524 | 6/1973 | Dahlberg | 219/121 LM |
| 3,787,873 | 1/1974 | Sato et al. | 219/121 LM |
| 3,800,991 | 4/1974 | Grove et al. | 219/121 LM X |
| 3,832,948 | 9/1974 | Barker | 219/121 LM X |
| 3,909,582 | 9/1975 | Bower | 219/121 LM |
| 3,932,726 | 1/1976 | Verheyen et al. | 219/121 LM |

OTHER PUBLICATIONS

"Laser Damage in Glass," British Journal of Applied Physics, 1965, vol. 16.

*Primary Examiner*—J. V. Truhe
*Assistant Examiner*—Mark Paschall
*Attorney, Agent, or Firm*—Imirie, Smiley & Guay

[57] ABSTRACT

A method for the decoration of a transparent plastics material article comprising the steps of providing an article having a transparent plastics material body to be decorated, said article body to be decorated having internal stresses and having characteristic physical properties, and directing a pulsed laser beam having a pulse energy and a pulse duration into the body of said article, said laser beam being successively focussed by an optical focussing system in different regions within the body of said article, said pulse energy and said pulse duration being selected in dependence upon the desired extent of the decorative features.

3 Claims, 1 Drawing Figure

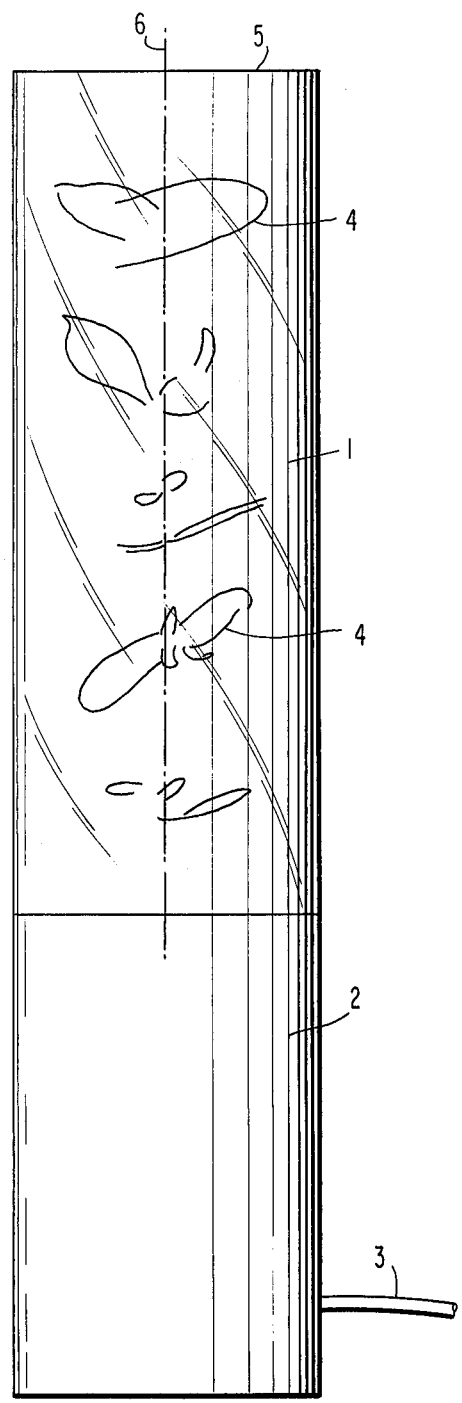

METHOD OF DECORATING A TRANSPARENT PLASTICS MATERIAL ARTICLE BY MEANS OF A LASER BEAM

The present invention relates to a method of decorating a transparent plastics material article by means of a laser beam. The article may, for example, be a table lamp or a background lamp for watching television or for illuminating corridors.

In known methods of decorating transparent plastics material articles, the decorative effects are created before or during the moulding of the articles, usually by including therein the object, such as the decorative objects; in particular figurines or metallic leaves.

The present process is, however, differentiated from these methods by the feature that the decorative effects are produced after the moulding and the external finishing of the object.

According to the present invention, there is provided a method for the decoration of a transparent plastics material article by means of a laser beam, wherein a pulsed laser beam is directed into the body of the article to be decorated, the article body having internal stresses during the firing of the laser beam and having the physical properties characteristic of certain materials such as a crystalline character, the laser beam being successively focussed in different regions within the body of the article, the pulse energy and duration being selected in dependence upon the extent of the desired decorative features.

The invention will be further described, by way of example, with reference to the accompanying drawing, the single FIGURE of which shows one embodiment of a part of a table lamp decorated by a method in accordance with the present invention.

In the FIGURE, a decorative article 1 is shown mounted on a base 2 of a table lamp provided with an electrical lead 3.

The article 1 is a Plexiglas (Registered Trade Mark) cylinder, which is a polymeric methacrylate ester which has a crystalline character and internal stresses which are set up at the time of its manufacture. However, it is also possible to create these internal stresses by external forces. The dimensions can be selected from within a relatively wide range, but for the preferred application, the diameter is ideally between 35 and 80 mm and the height between 85 and 205 mm.

To obtain the desired decorative features 4, which are shown in a purely schematic form in the drawing, a pulsed laser beam, the axis 6 of which is denoted by a broken line, is directed at the flat surface 5 of the cylinder perpendicularly thereto.

The laser is preferably a ruby laser but may be a neodymium laser. The requirements with regard to mechanical or electrical stability are not very great. Thus, it is sufficient if the laser is capable of supplying about ten Joules per pulse with a pulse duration of 100 to 300 μs, corresponding approximately to the conditions of piercing.

The decoration process is quite simple. The Plexiglas article is aligned, for example, so that its medial line is aligned with the axis of the laser beam. The optical system of the laser is then adjusted in such a manner as to focus the energy on a preselected point, which point is neighbouring the region which it is desired to decorate. The focussed laser beam goes into the body of the resinous cylinder, the small local absorptions of energy showing themselves by producing gas, which set up pressures which may be considerable. This suffices to cleave the material into the form of discs or very thin plates in the regions of internal stresses. These cracks are rendered visible by a change in the refractive index in this plane, creating a separation between two zones of the cylinder. The extent of these planes is a function of the energy density. By modifying the energy of the beam for an unchanged focal distance and pulse time, it is possible to change the extent of the decorative feature. By making the pulse time extremely short, the form of the decorative feature is changed and thin leaves or plates are not obtained, but instead a mass of thin forms centered on the epicentre of the micro-explosion result. The limit of the energy of the laser beam is set by the energy which causes the destruction of the Plexiglas cylinder. Experiments have shown that a pulse time of from 100 to 300 μs gives the best results for a focal distance of from 100 to 200 mm, according to the length of the article. The exterior of the article is preferably polished before it is decorated. The face thereof upon which the laser beam falls must be clean and transparent to the laser beam.

The decorated plastics material article may be utilised as it is as a decorative article such as a paper weight but is preferably utilised as the luminous part of a lamp.

The decorated article is lit by an electric light bulb. In a preferred embodiment, in order to limit the heating of the base, a bulb of 6V is fed by a transformer molded in a synthetic resin. The lamp is connected to a source of electrical power by the lead 3.

The above-described method can be applied to a multitude of articles of different materials and shapes. Instead of a cylindrical article, it is possible to use rectangular, pyramidal, polygonal or spherical shapes and the laser beam can be directed at any angle into the article to be decorated. A good transparency for the wavelength of the laser beam employed is one of the conditions which must be satisfied if the article is to be decorated. Another essential condition is that the article must have internal stresses and a crystalline character. The internal stresses can be easily detected by a set of polarisers.

To improve the luminous effect of the article, it is possible to deposit a reflective layer on all or part of the surface or surfaces of the article which is opposite the luminous source of the lamp. Alternatively, a polariser can be located between the lamp bulb and the article which causes, by looking through an analyser, a coloured effect on the decorative features.

Plexiglas is an example of a plastics material which is suitable for the article to be decorated. However, any transparent plastics material having a crystalline character can also be used.

The preceding description is not limitative. It is obvious that variations, within the scope of the appended claims, are possible with regard to the shape, colour and illumination of the articles.

I claim:

1. A method for the decoration of a transparent plastics material article comprising the steps of providing an article having a transparent plastics material body to be decorated, said article body to be decorated having internal stresses and a crystalline character, and directing a pulsed laser beam into the body of said article, said laser beam being successively focussed by an optical focussing system in different regions within the body of said article, said pulse energy and said pulse duration being selected in dependence upon the extent of the desired decorative features.

2. A method as recited in claim 1 wherein said laser is a ruby laser and said pulse duration is from 100 to 300 μs, and said optical focussing system has a focal length of from 100 to 200 mm.

3. A method as recited in claim 1 wherein said article is a cylinder made of a polymeric methacrylate ester, said cylinder having a diameter of from 35 to 80 mm and a length of from 85 to 205 mm, said laser beam being directed into one end face of said cylinder in a direction perpendicular to said end face and coincident with the axis of said cylinder, the focal point of said optical focussing system being inside the wall of said cylinder.

* * * * *